United States Patent [19]

El-Soudani

[11] Patent Number: 5,830,289
[45] Date of Patent: Nov. 3, 1998

[54] PROCESS FOR ENHANCING THE BOND STRENGTH OF RESISTANCE WELDED JOINTS BETWEEN TITANIUM ALLOY ARTICLES

[75] Inventor: Sami M. El-Soudani, Cerritos, Calif.

[73] Assignee: Boeing North American, Inc., Seal Beach, Calif.

[21] Appl. No.: 595,316

[22] Filed: Feb. 1, 1996

[51] Int. Cl.⁶ .................................................. C21D 9/50
[52] U.S. Cl. .......................... 148/524; 148/526; 148/527; 148/669; 228/262.71
[58] Field of Search ................... 148/524–529, 148/669; 228/181, 262.71

[56] References Cited

U.S. PATENT DOCUMENTS

| | | | |
|---|---|---|---|
| 3,769,101 | 10/1973 | Woodward | 148/669 |
| 4,029,254 | 6/1977 | Blair et al. | 228/181 |
| 4,522,859 | 6/1985 | Blair | 428/116 |
| 4,869,421 | 9/1989 | Norris et al. | 228/181 |
| 4,893,743 | 1/1990 | Eylon et al. | 228/181 |
| 5,024,369 | 6/1991 | Froes et al. | 228/157 |
| 5,135,156 | 8/1992 | Bower | 228/181 |
| 5,199,631 | 4/1993 | Anderson et al. | 228/181 |
| 5,226,982 | 7/1993 | Eylon | 148/522 |
| 5,226,989 | 7/1993 | Sukonnik | 148/670 |

FOREIGN PATENT DOCUMENTS

| | | | |
|---|---|---|---|
| 6-320289 | 11/1994 | Japan | 148/528 |
| 897887 | 1/1982 | U.S.S.R. | 148/527 |

*Primary Examiner*—George Wyszomierski
*Attorney, Agent, or Firm*—Lawrence N. Ginsberg; Charles T. Silberberg

[57] ABSTRACT

A process for enhancing the bond strength of resistance welded joints between titanium alloy articles includes a first step of resistance welding two titanium alloy articles and a second step of heat treating the resistance welded titanium alloy articles in a vacuum or inert environment at temperatures in a range of 1675° F. to 1825° F. for a period of 15 minutes to 4 hours. The process of the present invention is particularly useful in providing efficient joining of face sheets to a honecomb core element.

11 Claims, 6 Drawing Sheets
(2 of 6 Drawing Sheet(s) Filed in Color)

PROCESS FOR ENHANCING THE BOND STRENGTH OF RESISTANCE WELDED JOINTS BETWEEN TITANIUM ALLOY ARTICLES

BACKGROUND OF THE INVENTION

1. Field of the Invention

The present invention relates to methods for processing titanium alloys and, more particularly, to a process for enhancing the bond strength of a metallurgical joint between two titanium alloy articles.

2. Description of the Related Art

The high performance technologies of the future will impose increasing demands on new improved lightweight, high strength materials, such as titanium alloys.

One area of interest is the high speed civil transport (HSCT) aircraft. The main focus of the HSCT is to upgrade proposed aircraft structures to be compatible with Mach 2.4 vehicle requirements for the purpose of replacing or upgrading the existing Concorde Mach 2.0 technology.

Currently, HSCT emphasis is on the use of titanium alloys because, under Mach 2.4 conditions, they exhibit damage tolerance and durability, as well as thermal stability, required for the expected 72,000 hours at supersonic cruise temperatures of about 350° F. throughout one airplane lifetime. At such temperatures, virtually all heat treatable aluminum alloys experience aging degradation of critical properties, such as fracture toughness, with prolonged duration of service exposure. The outcome of recent investigations suggests that the maximum use temperature for the most advanced aluminum-lithium alloys is about 225° F. This conclusion inevitably minimizes the use of aluminum alloys as outer skins and associated structures. If a similar conclusion is drawn for non-metallic composites, then only titanium alloys would remain as the sole viable candidate material system for such high temperature, long life applications.

On the other hand, severe goal property requirements have been imposed on titanium alloys by major aircraft vehicle contractors. As yet, these requirements remain beyond reach by all of the current state-of-the-art titanium alloys.

Substantial weight reductions and more efficient system performances have been achieved through replacements of the heavier superalloys and/or steels with titanium, which, in turn, may have to be fabricated in the form of lightweight structural components such as efficient honeycomb sandwiches, in view of the severe demands of ultra light weight HSCT and/or other aerospace structural applications.

Enhancement of titanium alloy properties has been achieved in the process disclosed and claimed in U.S. Pat. Ser. No. 08/339,856, entitled "A Method for Processing-Microstructure-Property Optimization of Alpha-Beta Titanium Alloys to Obtain Simultaneous Improvements in Mechanical Properties and Fracture Resistance", assigned to Rockwell International Corporation.

Resistance welded honeycomb titanium alloy structures are known in the field. However, they tend to exhibit lower flatwise tension strength in comparison with other joining methods, e.g. aluminum brazed honeycomb or transient liquid phase bonding. Post-weld thermal processing is important. As will be disclosed below, the present patent application describes an improved processing sequence in this field.

OBJECTS AND SUMMARY OF THE INVENTION

It is, therefore, a principal object of the present invention to enhance the bond strengths of metallurgical joints between titanium alloy articles.

Another object of the present invention is to provide an efficient joining of face sheets to a honeycomb core element with improved balance of strength properties of the face sheets and the core element.

These and other objects are achieved by the present process, which includes, in its broadest aspects, the steps of:

a) resistance welding two titanium alloy articles; and b) heat treating the resistance welded titanium alloy articles in a vacuum or inert environment at temperatures in a range of 1675° F. to 1825° F. for a period of 15 minutes to 4 hours.

Although, in the past, titanium alloy articles have been resistance welded and post-weld thermally processed for joint enhancement, such post-weld treatments have not been entirely successful due to deficient processing parameters for the given material. The present invention provides the above-mentioned improved thermal processing parameters for joint enhancement in titanium alloys after resistance welding. The present Applicant has found that, in the specified temperature range and period of time, the inter-diffusion of joint materials takes place at such higher rates as to provide enhanced homogeneous bond interface microstructures, which, in turn, provide for higher interface bond strength. Surprisingly, such high temperatures are required to eliminate interfacial oxide layers and other defective microstructures.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference characters.

DETAILED DESCRIPTION OF THE PREFERRED EMBODIMENT

Figure 1:
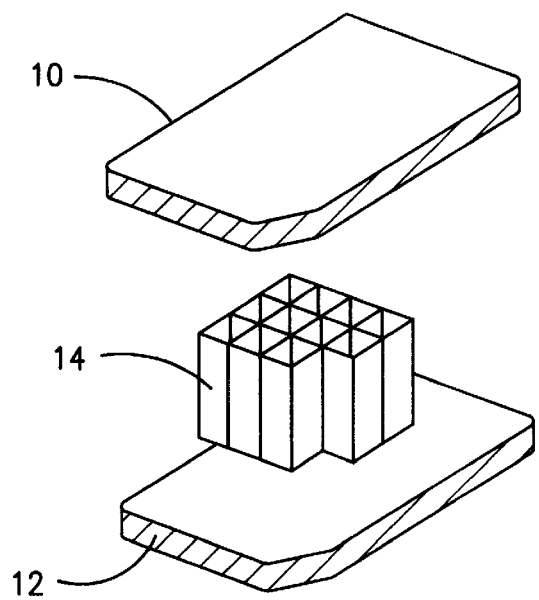
FIG. 1 is an exploded perspective view of portions of typical articles being metallurgically joined by the process of the present invention.

Referring now to the drawings and the characters of reference marked thereon, FIG. 1 shows two titanium alloy face sheets 10, 12, which are to be joined to a titanium alloy honeycomb core element 14. The face sheets 10, 12 may be formed of, for example, alpha-beta titanium alloys. Alternatively, the titanium alloy articles may be near alpha or beta alloys. The principles of the present invention, as will be disclosed below, are particularly advantageous with the use of a honeycomb core element 14. However, it is understood that other types of core element configurations are within the purview of this invention. Honeycomb core elements are particularly advantageous because they provide the capability of greater weight reductions for the same structural stiffness. Such honeycomb core structures and other stiffened structures are commonly used in the construction of aircraft.

Figure 2:
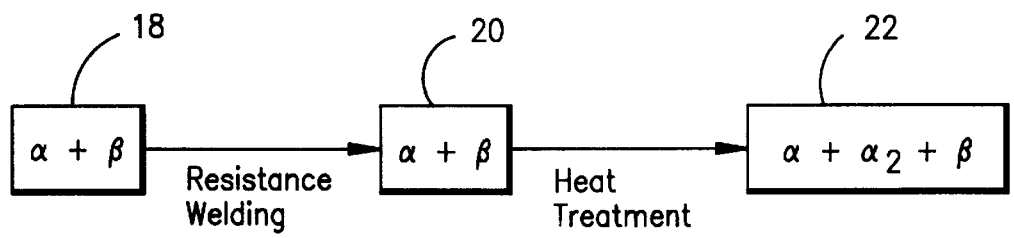
FIG. 2 is a block schematic diagram of the fabrication processing sequence for joint enhancement while transforming titanium alloy article microstructures from $\alpha+\beta$ to $\alpha+\alpha_2+\beta$.

Referring now to FIG. 2, a block schematic diagram of the fabrication processing sequence for joint enhancement, while transforming titanium alloy article microstructures from $\alpha+\beta$ to $\alpha+\alpha_2+\beta$ is illustrated, designated generally as 16. Two titanium alloy articles having $\alpha+\beta$ microstructures 18 are resistance welded. The resistance welding technique is well know in this field. In the resistance welding technique two materials are brought together under pressure and large electrical currents are applied through the contact interface between the two articles. As a result of electrical resistance heating at the contact interface, a small weld nugget of molten metal is formed, thus achieving the bond upon its solidification. This step of resistance welding may be applied in different configurations by spot welds or continuous seem welds. The $\alpha+\beta$ microstructure is maintained, even after resistance welding, as shown by block 20.

Upon weld metal shrinkage, the bonded materials are brought together in contact, which extends over areas outside the molten weld nuggets. In accordance with the process of the present invention, the articles are then heat treated at temperatures in a range of 1675° F. to 1825° F. for a period of 15 minutes to 4 hours to further bond additional contact areas brought together by the shrinkage stresses exerted by the resistance weld. This heat treatment step also converts the $\alpha+\beta$ microstructure to an $\alpha+\alpha_2+\beta$ microstructure as shown by block 22. Although a broad range of temperatures and a broad heat treatment period was discussed above, it is preferred that the heat treatment be in a range of between about 1700° F. and 1800° F. for a period of 1–3 hours. The heat treatment step discussed herein is provided in a vacuum or inert environment, preferably a vacuum environment. (If an inert environment is used, it should be pure argon or helium.)

Figure 3:
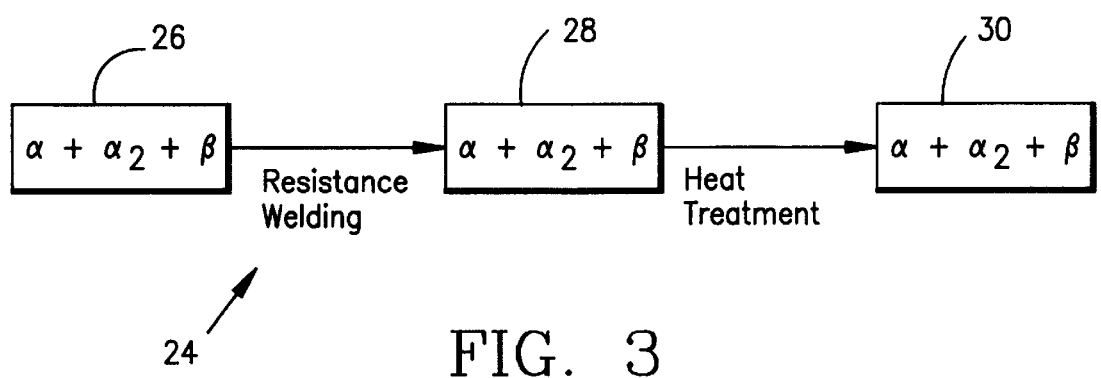
FIG. 3 is a block diagram of the fabrication processing sequence for joint enhancement while retaining/regenerating the $\alpha+\alpha_2+\beta$ microstructure.

Referring now to FIG. 3, the processing techniques of the present invention are illustrated, as applied to titanium alloy articles having $\alpha+\alpha_2+\beta$ microstructures initially, as designated generally by 24. The $\alpha+\alpha_2+\beta$ titanium alloy articles 26 are resistance welded as discussed above in the previous embodiment. The $\alpha+\alpha_2+\beta$ microstructure is preserved, as shown by numeral designation 28. The joined articles are then heat treated. It is understood that the $\alpha+\alpha_2+\beta$ microstructure is retained in the bonded articles with the exception of the weld nugget, which may be $\alpha+\beta$. The heat treatment temperature ranges and time periods are as discussed above with respect to the FIG. 2 embodiment. The $\alpha+\alpha_2+\beta$ microstructure is preserved/regenerated after heat treatment, as shown by block 30.

Figure 4:
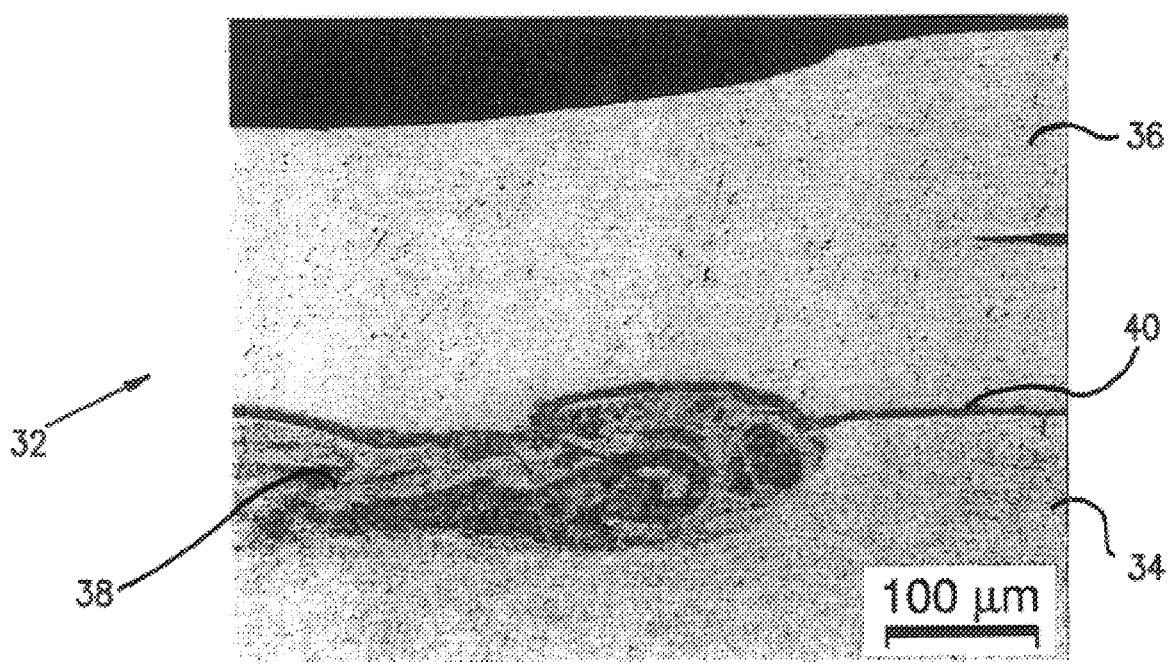
FIG. 4 is a micrograph of a typical metallurgical bond joint (resistance spot weld) in accordance with the principles of the first step of the present invention.

Referring now to FIG. 4, a micrograph of a typical resistance spot welded metallurgical bond joint is illustrated, in accordance with the principles of the first step of the present process. This bond joint designated generally as 32. The materials joined in FIG. 4 are a Ti 6242S face sheet 34 and a honeycomb core of Beta 21S alloy, designated by numeral designation 36. The micrograph shows a weld nugget of molten metal 38 adjacent to a contact surface 40.

Figure 5:
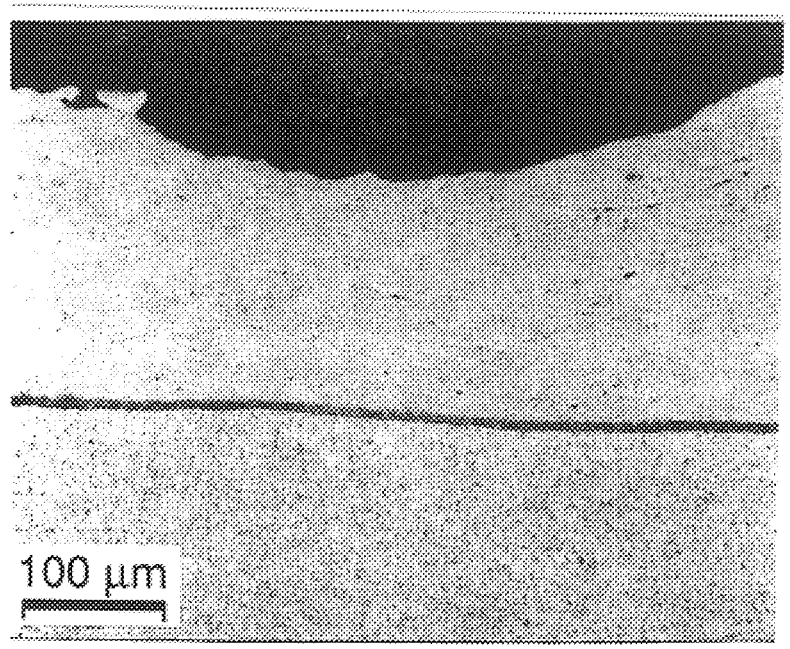
FIG. 5 is a micrograph showing a deficient bond interface between a Ti 6242S face sheet and Beta 21S honeycomb core resulting from a conventional relatively low temperature heat treatment (1625° F. heat treatment for 2 hours).

FIG. 5 (Prior Art) shows a cross section of the contact surface following post-weld thermal processing at an undesirably low subsequent heat treatment processing temperature of 1625° F., for two hours. The interface morphology is substantially the same as the interface 40 of the solely resistance spot welded sample of FIG. 4.

Figure 6:
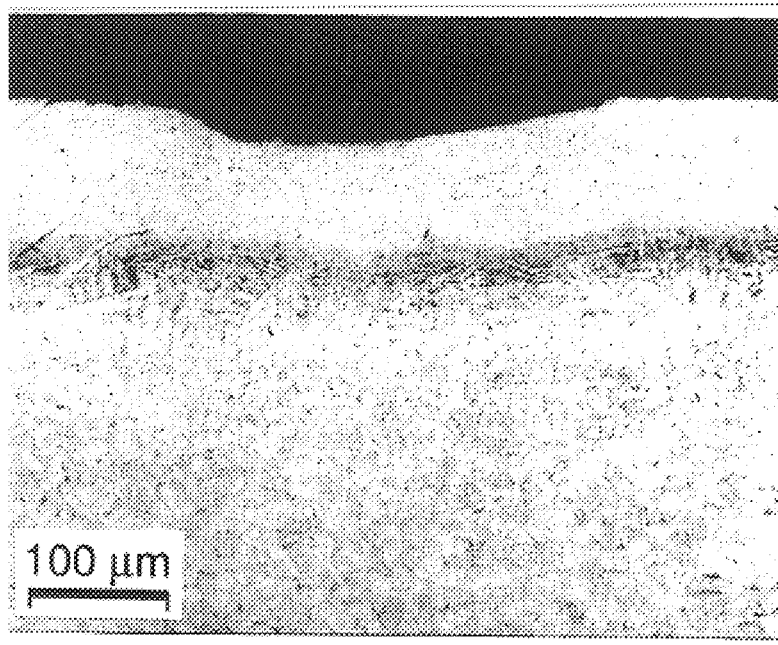
FIG. 6 is a micrograph showing a bond interface between a Ti 6242S face sheet and a Beta 21S honeycomb core resulting from processing in accordance with the principles of the present invention (1800° F. heat treatment for 2 hours).

FIG. 6 illustrates the advantages of the higher temperature heat treatment of the present invention. In this sample, the articles were heated to 1800° F. for two hours. The interface morphology comprises a very broad domain of diffusion with mutually attractive phases. This substantially increases the bond strength of the joint.

Figure 7:
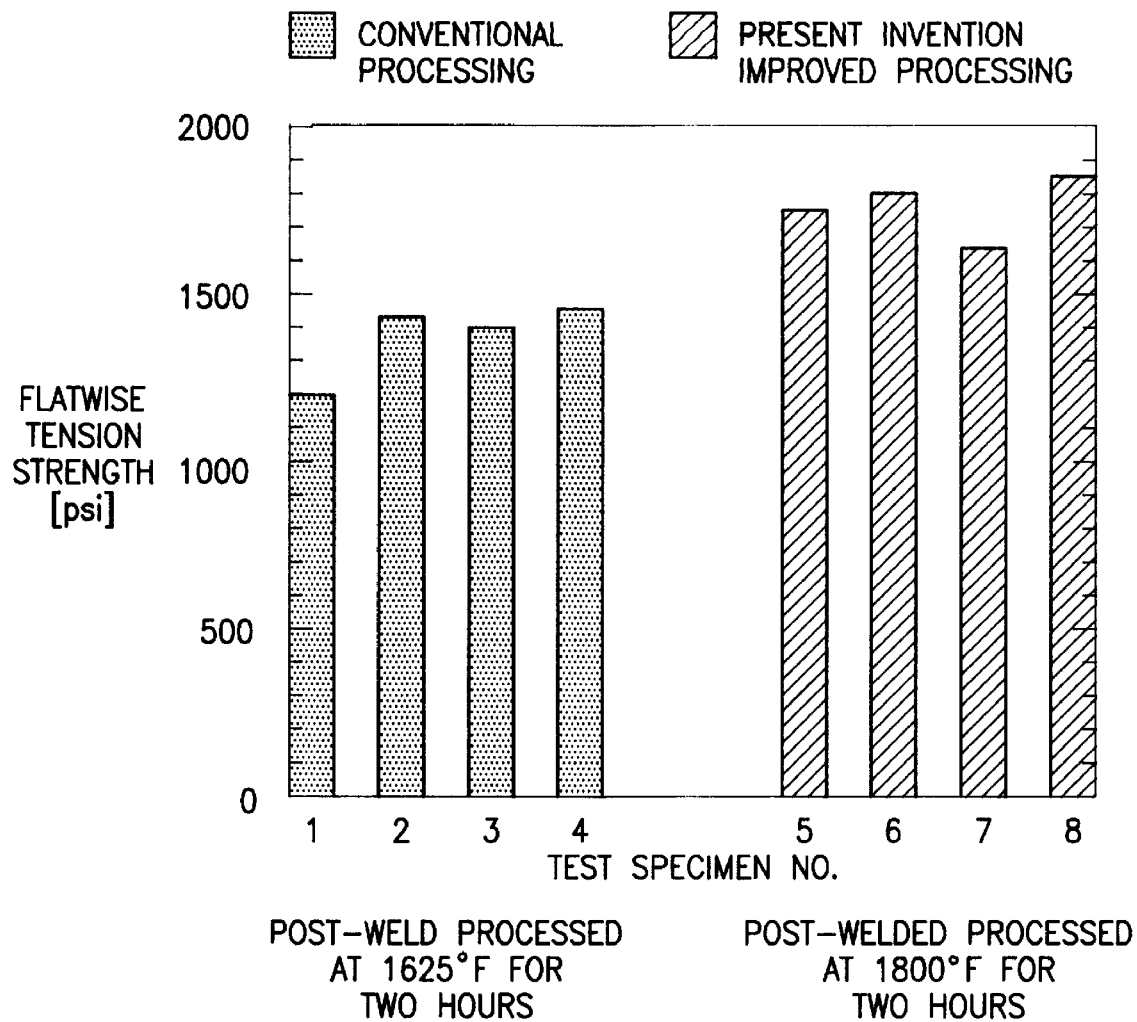
FIG. 7 is a graph of flatwise tension strength as a function of post-weld processing temperatures and hold times for various test specimens illustrating the respective strength property scatter bands of bond joints.

FIG. 7 illustrates the results of mechanical tests comprised of flatwise tension testing of small honeycomb elements excised from honeycomb elements processed in accordance with methods discussed above with respect to FIGS. 5 and 6. In FIG. 7, reference to "Conventional Processing" means processing described above with respect to FIG. 5, that is at 1625° F. heat treatments. Reference to "Present Invention Improved Processing" means heat treatments in accordance with the discussion of FIG. 6 of the present invention (1800° F. heat treatment for two hours). The flatwise tension test is a well known method in evaluating the strength of honeycomb sandwiches. It consists of bonding pull bar elements to the faces of a honeycomb segment measuring about 2×2 inches. In this test, the tensile forces are thus directed to separate the face sheets from the core element in a direction normal to the face sheet. As can be seen by FIG. 7, the process of the present invention provides a substantial increase in the strength of the face sheet to core bond joint strength. This is due to the improved interface diffusion illustrated in FIG. 6 as compared to the prior art FIG. 5.

Figure 8:
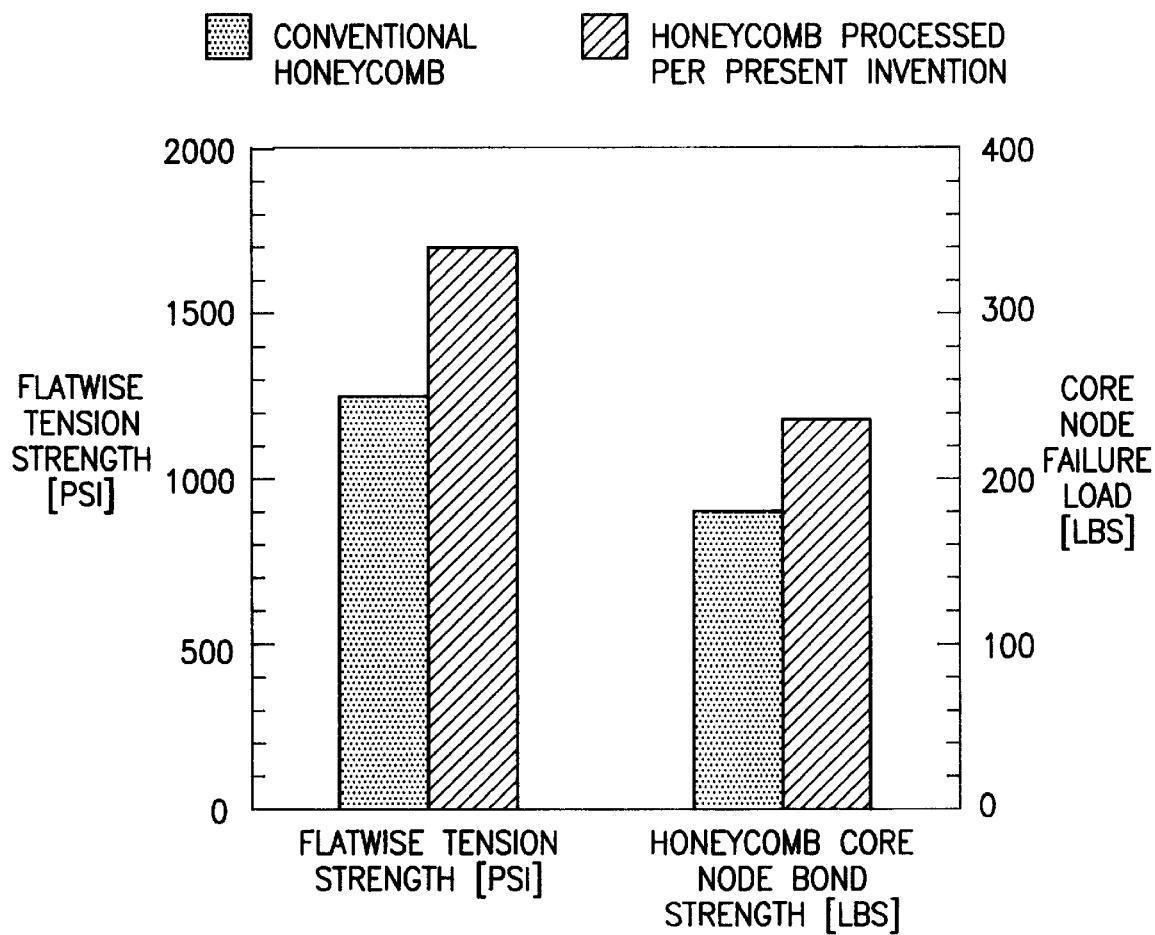
FIG. 8 is a graph of flatwise tension strength as a function of post weld processing methods, showing the superior bond enhancement of the present invention both at face-sheet-to-core joint and core-to-core joint.
Figure 9A:
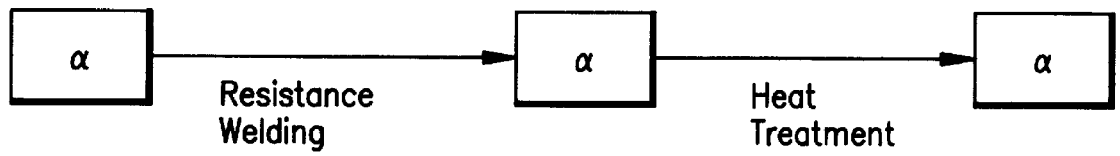
FIGS. 9a, 9b, 9c, and 9d are block diagrams illustrating the fabrication processing sequence of the present invention, as applied to various alpha/beta titanium alloy systems.
Figure 9B:
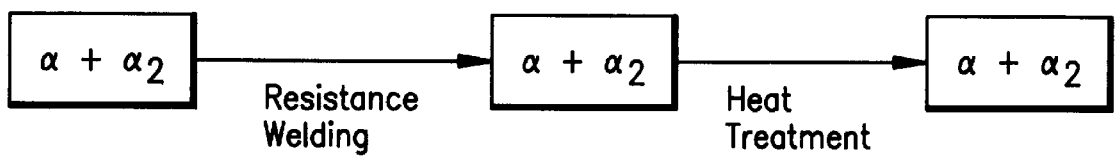
Figure 9C:
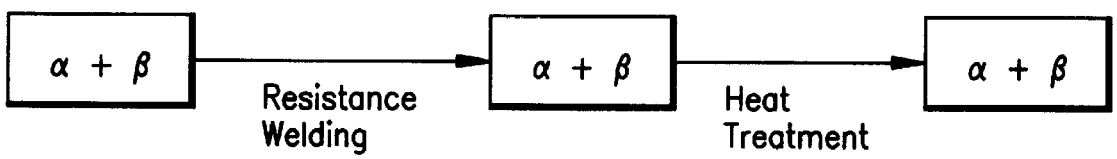
Figure 9D:
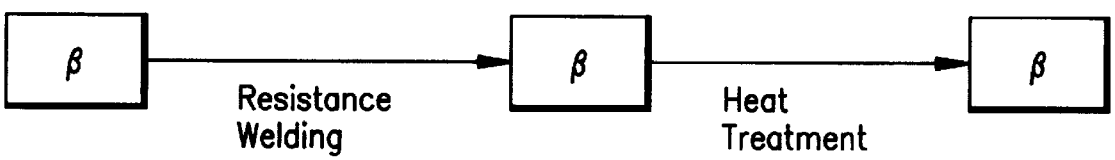

Referring now to FIG. 8, the left side of the graph presents the average values of the measured flatwise tension strength test results shown in FIG. 7. The right side of FIG. 8 shows a comparison of the associated core node bond strength. The nodes were prepared by resistance spot welding similar to that illustrated in FIG. 4. The strength enhancement of the core node bond is due to the same effects, which improved the face sheet to core bond joint.

The present invention preferably includes a step of cooling the titanium alloy articles after the step of heat treating discussed above, and then aging the articles at a temperature in a range of about 850° F. to 1150° F. for a period of about 8 hours to 24 hours to prevent silicide precipitation. The step of aging preferably comprises aging the articles at a temperature of about 1100° F. It is understood that the step of cooling comprises cooling in a protective environment. This step of cooling is preferably conducted at a cooling rate in a range of 5° F. per minute to 500° F. per minute.

Unlike diffusion bond applications of the prior art, which generally involve the application of high pressures, the process of the present invention does not require such a complicating process application. The bonded surfaces outside the weld zone are brought together in solid contact by the shrinkage stresses of the resistance welds in the absence of the external mechanical forces acting on the titanium alloy articles.

Obviously, many modifications and variations of the present invention are possible in light of the above teachings. For example, FIGS. 9a–d illustrates various other alpha/beta titanium alloy systems which may utilize the principles of the present invention. It is, therefore, to be understood that, within the scope of the appended claims, the invention may be practiced otherwise than as specifically described. What is claimed and desired to be secured by Letters Patent of the United States is:

What is claimed is:

1. A process for enhancing the bond strength of a metallurgical joint between two titanium alloy articles, comprising the steps of:
   a) resistance welding two titanium alloy articles; and
   b) heat treating said resistance welded titanium alloy articles in a vacuum or inert environment at temperatures in a range of 1675° F. to 1825° F. for a period of 15 minutes to 4 hours wherein said process is performed in the absence of any substantial external mechanical forces intended for enhancing the metallurgical joint between said titanium alloy articles.

2. The process of claim 1, wherein said step of resistance welding comprises resistance welding a honeycomb core structure with a face sheet.

3. The process of claim 1, wherein said step of resistance welding comprises resistance welding $\alpha+\beta$ titanium alloy articles; and wherein said step of heat treating comprises heat treating in a range of 1700° F. to 1800° F. for a period of 1–3 hours.

4. The process of claim 1, wherein said step of resistance welding comprises:
   resistance welding at least one $\alpha+\beta$ titanium alloy article to a second titanium alloy article; and
   wherein said step of heat treating comprises heat treating in a range of between 1700° F.–1800° F. for a period of 1–3 hours to transform said at least one $\alpha+\beta$ titanium alloy article into an $\alpha+\alpha_2+\beta$ titanium alloy article.

5. The process of claim 4, wherein said second titanium alloy article also has an $\alpha+\beta$ microstructure.

6. The process of claim 1, wherein said step of resistance welding comprises:
   resistance welding at least one $\alpha+\alpha_2+\beta$ titanium alloy article to a titanium alloy article; and
   wherein said step of heat treating comprises heat treating in a range of between 1700° F.–1800° F. for a period of 1–3 hours.

7. The process of claim 1, wherein said second titanium alloy article also has an $\alpha+\alpha_2+\beta$ microstructure.

8. The process of claim 1, wherein said step of heat treating is conducted in a vacuum environment.

9. The process of claim 1, further including a step of cooling said titanium alloy articles after said step of heat treating and then aging said articles at a temperature in a range of about 850° F. to 1150° F. for a period of about 8 hours to 24 hours to prevent silicide precipitation.

10. The process of claim 9, wherein said step of aging comprises aging said articles at a temperature of about 1100° F.

11. A process for enhancing the bond strength of a metallurgical joint between two titanium alloy articles, comprising the steps of:
   a) resistance welding two titanium alloy articles;
   b) heat treating said resistance welded titanium alloy articles in a vacuum or inert environment at temperatures in a range of 1675° F. to 1825° F. for a period of 15 minutes to 4 hours;
   c) cooling said titanium alloy articles; and
   d) aging said articles at a temperature in a range of 850° F. to 1150° F. for a period of 8 hours to 24 hours wherein said process is performed in the absence of any substantial external mechanical forces intended for enhancing the metallurgical joint between said titanium alloy articles.

* * * * *